United States Patent

Symmons

[15] 3,638,678
[45] Feb. 1, 1972

[54] DUPLEX VALVE
[72] Inventor: Paul C. Symmons, Newton, Mass.
[73] Assignee: Symmons Industries, Incorporated, Braintree, Mass.
[22] Filed: May 6, 1970
[21] Appl. No.: 35,053

[52] U.S. Cl. .......................................... 137/595, 137/636.1
[51] Int. Cl. ........................................................... F16k 11/10
[58] Field of Search ................................ 137/594, 595, 636.1

[56] References Cited

UNITED STATES PATENTS

| 2,452,295 | 10/1948 | Elliott | 137/636.1 |
| 2,504,610 | 4/1950 | Wolf | 137/636.1 X |
| 2,676,615 | 4/1954 | Symmons | 137/595 |
| 3,403,700 | 10/1968 | Meynell | 137/636.1 |

Primary Examiner—Henry T. Klinksiek
Attorney—Schiller & Pandiscio

[57] ABSTRACT

A hot and cold water supply valve for a washing machine adapted by operation of a single control lever to (a) prevent flow of both hot and cold water to the machine, (b) pass only cold water, or (c) pass both hot and cold water.

6 Claims, 6 Drawing Figures

PATENTED FEB 1 1972

PAUL C. SYMMONS
INVENTOR.

BY Schiller & Pandiscio

ATTORNEYS

PAUL C. SYMMONS
INVENTOR.

BY Schiller & Pandiscio

ATTORNEYS.

DUPLEX VALVE

This invention relates to duplex valves and more particularly to an improvement in washing machine water supply valves of the type described in my U.S. Pat. No. 2,676,615.

Duplex valves of the type described in my prior patent are used as shutoffs for the hot and cold water supplies of washing machines. By completely turning off both hot and cold supplies, they remove pressure from the hose lines leading to the washer and eliminate danger of flooding from hose failure and damage to the washer solenoid valve when the machine is idle. My original duplex valve has an OFF position and an ON position. In the OFF position, both hot and cold water supplies are turned off. In the ON position, both supplies are turned on.

The advent of cold water detergents has made is desirable to individually control the cold water supply so that only cold water is supplied to the washer.

Accordingly the primary object of this invention is to provide a duplex water supply valve for washers that is adapted to supply only cold water or both cold and hot water to a washer.

A more specific object is to provide a duplex valve for connection to separate cold and hot water supplies that is capable of passing only cold water or both cold and hot water is simple and easy to manufacture, and may be used as a replacement for a valve constructed in accordance with the invention described in my prior U.S. Pat. No. 2,676,615.

The foregoing and other objects are attained by a valve which comprises a valve body with two inlets and two outlets and a cam-receiving chamber, a pair of valve members each mounted in the casing so as to control fluid flow between one of said inlets and one of said outlets, spring means normally holding the valve members in closed position, a cam mounted in said cam-receiving chamber for turning movement, and means for turning said cam, said cam and valve members being arranged so that turning movement of the cam a predetermined amount from a given position in which both valve members are closed causes only one of said valve members to be opened and turning movement of said cam an additional predetermined amount causes said one valve member to be held open and the other valve member to be opened. Indicia means are provided for indicating the setting of the valve.

Other features and advantages are set forth in the following detailed specification which is to be considered together with the accompanying drawings wherein.

Figure 1:
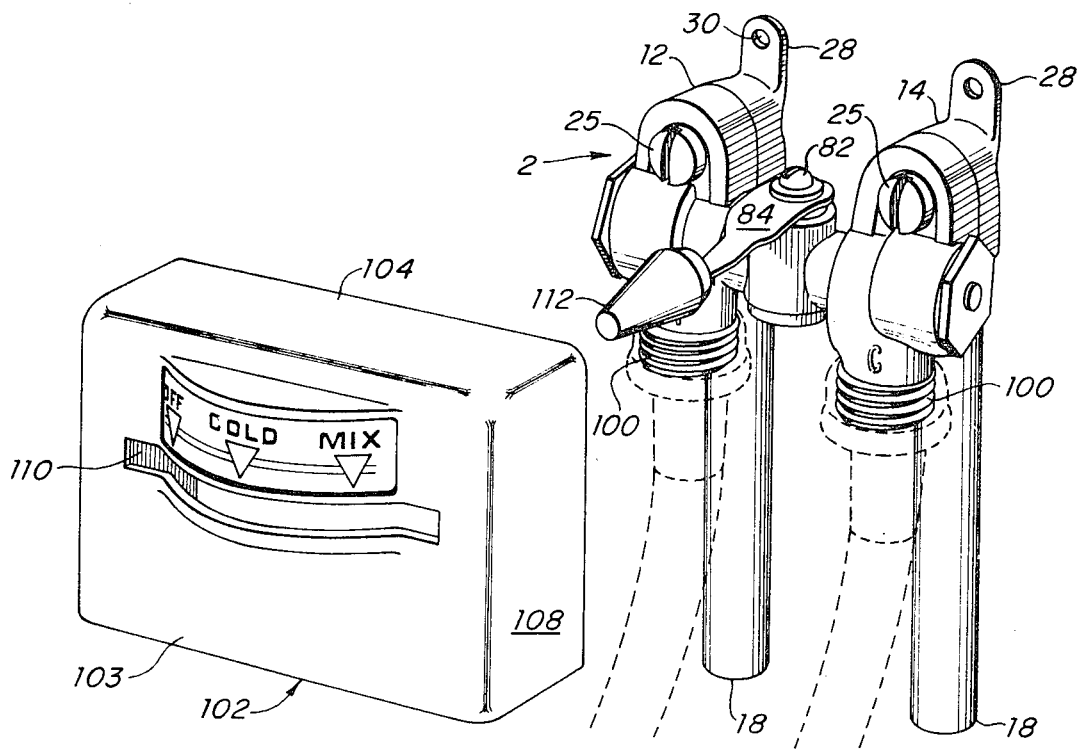
FIG. 1 is a perspective view of a duplex valve and valve cover constituting a preferred embodiment of the invention.
Figure 2:
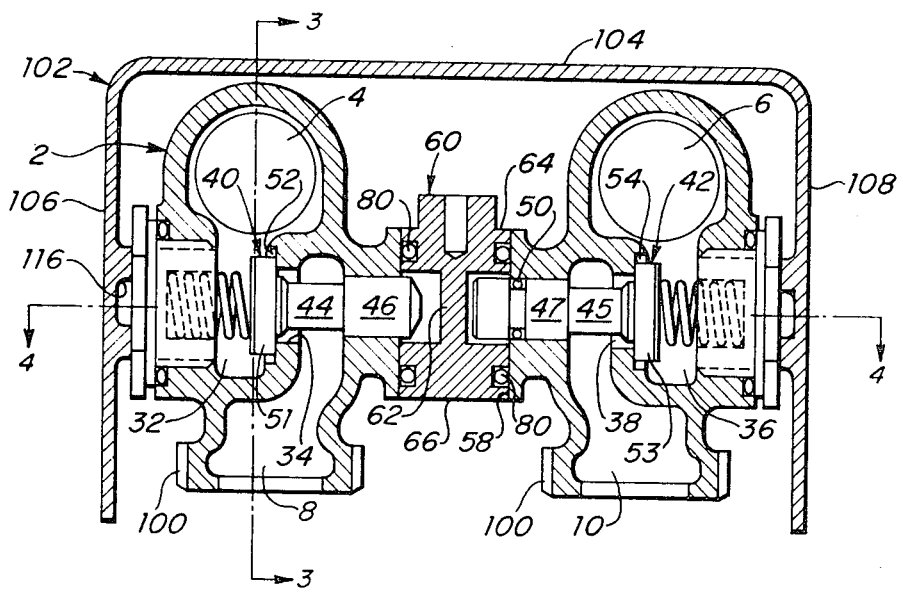
FIG. 2 is a vertical sectional view of the valve shown in FIG. 1.
Figure 3:
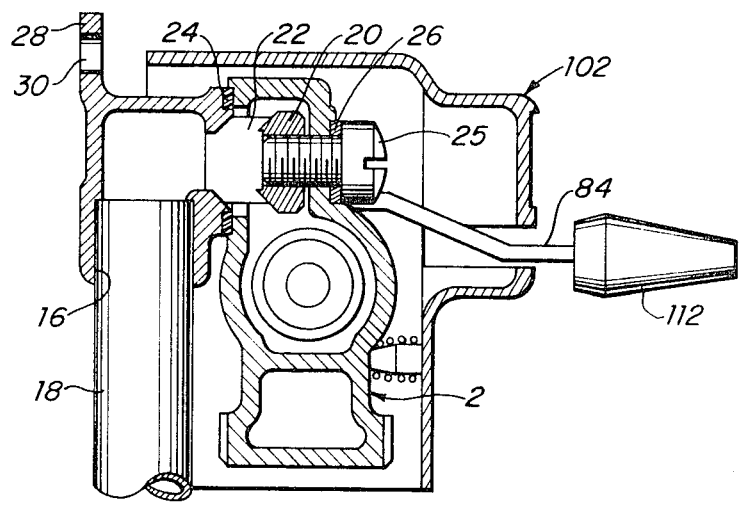
FIG. 3 is a sectional view taken along line 3—3 of FIG. 2.

Referring now to the drawings, the illustrated valve comprises a casing 2 having two separate inlets 4 and 6 and two separate outlets 8 and 10. The two inlets 4 and 6 are provided with identical fittings 12 and 14 respectively, which are separable from the body of the valve casing. As seen in FIG. 3 which shows fitting 12 in vertical section, the fittings 12 and 14 are essentially L-shaped comprising at one end an inlet 16 which is adapted to receive a water supply pipe 18. The inlet 16 may be provided with internal screws threads to receive the supply pipe 18; preferably, however, the inlet 16 is adapted for connection thereto of the supply pipe 16 by means of a soldered joint. The other end of the fitting has an extension in the form of a nose 20 which protrudes into the casing 2 via the inlet ports with which the fitting is associated. The nose 20 is provided with side ports as shown at 22 whereby water introduced through the supply pipe 16 may be directed into the valve casing. Additionally, each of the fittings 12 and 14 is provided with a shoulder that holds a resilient washer 24 against the rear side of the casing as shown so as to form a fluidtight seal. The fittings 12 and 14 are secured to the valve casing by like attaching bolts 25 which pass through openings in the front side of the valve casing and screw into the extension 20 of the fitting. Packings 26 are mounted between the heads of bolts 25 and the casing so as to form a fluidtight seal when the bolts are screwed up tight. Additionally, each of the fittings 12 and 14 is provided with one or more ears 28 with a hole 30 to receive a screw or other suitable fastener whereby the valve may be secured to a wall or other rigid structure.

The inlet 4 leads into a valve chamber 32 which is connected to the outlet 8 by means of a port 34. Similarly the inlet 6 leads into a valve chamber 36 which is connected to the outlet 10 by means of a valve port 38. Flow of water through the valve ports 34 and 38 is controlled by a pair of poppet valve members 40 and 42. Valve members 40 and 42 comprises stems 44 and 45 which terminates at one end in pistons 46 and 47 and at the other end in valve heads 48 and 49 respectively. It is to be noted that the piston 47 has a peripheral groove in which is mounted an O-ring 50 which provides a seal so as to prevent water flow from one side of the valve to the other via the cam-receiving chamber. The other piston 46 does not have an O-ring but one may be provided if desired. However, it is only necessary for one of the pistons to have an O-ring. Attached to and forming part of the valve heads 48 and 49 are resilient rings 51 and 53 respectively which are sized to engage valve seats 52 and 54 surrounding the valve ports 34 and 38 respectively. The valve chambers 32 and 36 are oppositely disposed, and the valve members 40 and 42 are mounted so that their stems 44 and 45 are axially aligned. The pistons 46 and 47 of the two valve members are mounted in and make a sliding fit with a pair of axially aligned bores 54 and 55 which lead into a cylindrical cam-receiving chamber 58.

Mounted in cam-receiving chamber 58 is a cam member identified generally by the numeral 60. The cam-receiving chamber 58 is formed as a through bore in the valve casing. The cam member 60 is generally cylindrical but is undercut between its ends so as to form to a cam section 62 located between two spaced circular flanges 64 and 66 which are sized to make a snug fit with the surrounding wall of the chamber 58. The under cutting whereby the cam portion is formed results in a pair of spaces on opposite sides of the cam portion for intrusion of the ends of the valve pistons 46 and 47. In this connection it is to be noted that piston 46 is shorter than piston 47 so that the former intrudes into the cam-recieving chamber to a lesser extent than the latter when valve heads 48 and 49 are seated against valve seats 52 and 54 respectively. As seen in FIGS. 2 and 4–6, the cam section 62 is elongated in cross section, comprising a pair of broad flat side surfaces 68 and 70 are parallel, a flat surface 72 at one end of surfaces 68 and 70, and two flat converging surfaces 74 and 76 and the other end of the surfaces 68 and 70. The surface 72 is slanted so that its intersection with surface 68 is closer to the cam member's axis of rotation than is its intersection with the surface 70. The surface 74 is shorter than the surface 76, and both surfaces are spaced further from the axis of rotation of the cam than any portion of the opposite end surface 72.

The cam member further includes O-rings 80 mounted in peripheral grooves in the circular flanges 64 and 66. They prevent escape of water via the space between the walls of the cam-receiving chamber and the cam member. The upper end of the cam member is provided with a tapped hole to receive a screw 82 which is used to secure in place an operating handle 84.

The valve further includes a pair of plug members 88 which are secured into opposite end openings in the casing that lead to the valve chambers 32 and 36. These end openings are aligned with the poppet valves and are large enough to permit removal of the poppet valves. Each plug has an axial cavity 92 which functions as a seat for a spring member 94 which bears against the head of the adjacent poppet valve member and acts to keep it seated on the adjacent valve seat 52 or 54. Additionally each plug 92 is provided with an exterior projection 98.

In practice the valve is installed with a cold water supply pipe attached to the fitting 14 associated with the inlet 6 and a hot water supply pipe is attached to the fitting 12 associated with the inlet 4. Washing machine hose lines (not shown) are attached to the outlets 8 and 10. In this connection it is to be noted that that the casing is provided with screw threads 100 surrounding the outlets 8 and 10 to permit attachment of the washing machine hoses. The opposite ends of the washing machine hoses lead to a solenoid controlled mixing valve (not shown) which is part of conventional automatic washing machines.

Once the valve has been installed, it is concealed by means of a cover member 102 which comprises a front panel 103, a top wall 104, and two opposite sidewalls 106 and 108. The front panel 102 is provided with an elongate slot 110 through which projects the operating handle 84. The exterior end of the handle 84 is provided with an operating knob 112. The cover is secured to the valve by means of a detent connection. The interior surfaces of the sidewalls 106 and 108 of the cover are provided with inclined ramps 114 and depressions 116 sized to accommodate the projections 98 on the ends of plugs 92. Additionally, the front panel 103 is provided with a pair of bosses 118 each of which is surrounded by a compression spring 120. The cover is made so that when not installed on the valve casing, the minimum inside distance between the sidewalls 106 and 108 is somewhat less than the overall distance between the ends of the projections 98 on plugs 92. It is applied to the valve by slipping the handle 112 through its slot 110 and forcing it rearward against the valve so that the ramps 114 engage the projections 98 and are thereby forced outwardly far enough to ride over the projections and to allow the depressions 116 to mate with projections 98, whereupon the sidewalls will snap back to their original position and the cover is locked in place by the engagement of projections 98 and depressions 116. Rearward movement of the cover is resisted by the springs surrounding the bosses 120. Removal of the cover is affected simply by forcing it sidewalls laterally away from the projections on the plugs, springs 120 force it forward away from the valve body. The cover may be made of sheet metal or plastic, but it must have sufficient resiliency to permit the detent locking action described above.

Figure 4:
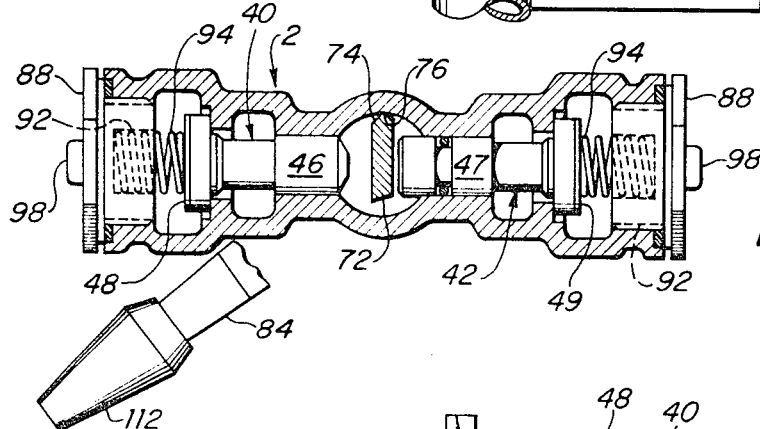
FIG. 4 is a cross-sectional view taken along line 4—4 of FIG. 2.
Figure 5:
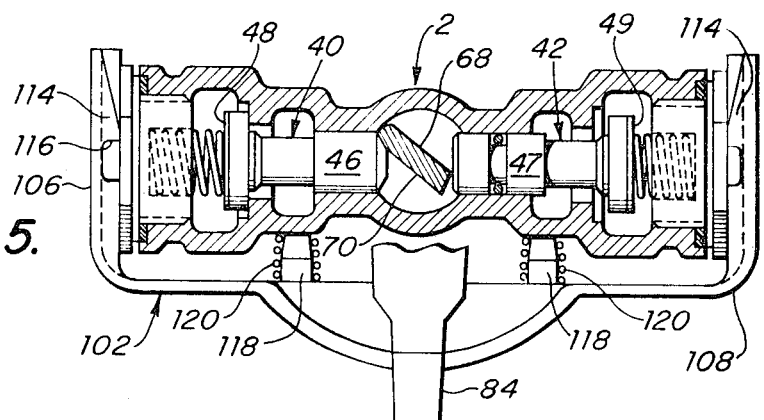
FIG. 5 is a view similar to FIG. 4 but with the valve in the cold water position.
Figure 6:
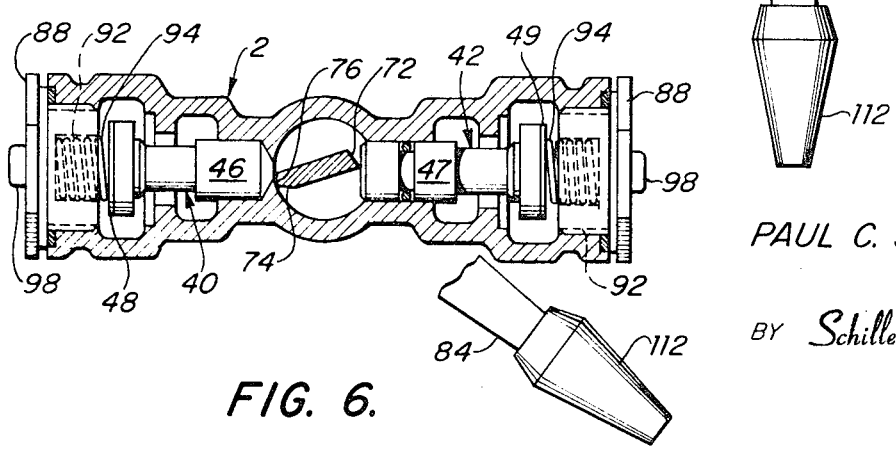
FIG. 6 is a view like FIG. 5 but with the valve in the combined hot and cold water positions.

Operation of the valve is straightforward. In the course of assembling the valve, the cam member is disposed in the casing so that when the handle is in its leftmost position as shown in FIG. 4, its broad surfaces 68 and 70 extend at a right angle to the axes of valve pistons 46 and 47, with the result that both valve members are closed and no water can pass from the inlets to the outlets. When the handle is moved to the center position shown in FIG. 5, the cam surface 72 moves into engagement with the end of the piston 47, displacing the latter so as to force the valve head 49 away from the adjacent valve seat 54, whereupon water can flow through the valve casing from the cold water supply line to the outlet 10. In this center position of the cam member, the cam surface 74 will not have advanced far enough (it may be spaced from or lightly engage the adjacent end of the piston 46) to cause valve member 40 to open, with the result that no hot water can flow through from the hot water supply line to the hot water outlet 8. The friction between the cam member and the casing and the water pressure acting on valve member 40 prevent the handle from returning to its original position. If the handle is now moved to the extreme right-hand position shown in FIG. 6, the cam surface 72 will continue to hold open the cold water valve 47 and the cam surface 74 will move the piston 46 away from the cam-receiving chamber, causing the associated valve 40 to open. When the handle is moved to its right-hand position, the cam member rotates far enough for its cam surface 76 to engage the end of piston 46. Reverse movement of the handle allows springs 94 to return the valve members to their original closed positions, the hot water valve member closing when the handle reaches its center position and the cold water valve member closing when the handle is returned to its initial off position. To facilitate use of the valve, the front panel of the cover may be provided with suitable indicia such as "Off," "Cold," and "Mixed" to designate the three handle positions. Movement of the handle beyond its Off and Mixed positions is prevented by engagement thereof with the adjacent portions of the valve casing.

Obviously the valve is subject to other modifications. Thus, for example, the fittings 12 and 14 may be modified so that their inner ends are similar to the construction shown in FIGS. 2 and 3 of my original U.S. Pat. No. 2,676,615. Another obvious change is to make the pistons of equal length and the stems 44 and 45 of unequal length, so that one piston extends further into the cam-receiving chamber than does the other piston. Still other modifications are obvious to persons skilled in the art.

The advantages of the invention are believed to be quite obvious. The construction above-described is characterized by essentially the same simplicity and ease of assembly and disassembly and the valve shown in my U.S. Pat. No. 2,676,615. Additionally, however, this new valve makes it possible for the user to control the flow of water so that only cold water or alternatively hot and cold water may be supplied to the washing machine. At the same tim, the user has the same convenience of controlling operation of the valve by means of a single lever. Other advantages are believed to be obvious to persons skilled in the art.

What is claimed is:

1. A valve comprising a valve casing having two separate inlets, a separate outlet for each inlet, and a separate valve port connecting each inlet with its outlet, a pair of spring-biased valve members each normally closing one of said valve ports, said valve members being oppositely disposed and in axial alignment, said casing also having a central portion with a cam-receiving chamber provided with two oppositely disposed openings, each valve member having an extension, said extensions projecting through said openings into said cam-receiving chamber, a cam member disposed in said chamber between the adjacent ends of said extensions and mounted for rotational movement, said cam member having two oppositely disposed cam portions adapted to engage said extensions and thereby move said valve members to open positions relative to said ports as the cam member is turned in one direction, said extensions and cam portions arranged so that as said cam is rotated from a first position to a second position, one of said valve members is moved to open position while the other valve member remains closed and as said cam is rotated further to a third position said one valve member is held in its said open position and said other valve member is moved to open position, a cover member for said casing, and first and second cooperating detent means on said cover member and casing respectively for releasably locking said cover member to said casing.

2. A valve according to claim 1 further including an operating handle connected to said cam member, said cover member having an opening through which said handle projects, said cover member opening being elongate in a given direction so as to permit movement of said handle in rotating said cam member between said first, second, and third positions.

3. A valve comprising a valve casing having two separate inlets, a separate outlet for each inlet, and a separate valve port connecting each inlet with its outlet, a pair of spring-biased valve members each normally closing one of said valve ports, said valve members being oppositely disposed and in axial alignment, said casing also having a central portion with a cam-receiving chamber provided with two oppositely disposed openings, each valve member having an extension, said extensions projecting through said openings into said cam-receiving chamber, a cam member disposed in said chamber between the adjacent ends of said extensions and mounted for rotational movement, said cam member having two oppositely disposed cam portions adapted to engage said extensions and thereby move said valve members to open positions relative to said ports as the cam member is turned in one direction, said extensions and cam portions arranged so that as said cam is rotated from a first position to a second position, one of said valve members is moved to open position while the other valve member remains closed and as said cam is rotated further to a third position said one valve member is held in its said open position and said other valve member is moved to open position, an additional pair of oppositely disposed access openings in said casing for providing access to said valve members, a pair of plugs removably mounted in and closing off said access openings, a cover member for covering said casing, said cover member comprising at least a front panel and a pair of side panels, and cooperating means on said plugs and said side panels for releasably locking said cover member to said casing.

4. A valve comprising a valve casing having two separate inlets, a separate outlet for each inlet and a separate valve port connecting each inlet with its outlet, first and second spring-biased valve members each normally closing one of said valve ports, said valve members being oppositely disposed and in axial alignment with each other, said casing also having a central portion with a cam-receiving chamber provided with two oppositely disposed openings, first and second extensions on said first and second valve members respectively, said extensions projecting through said openings into said cam-receiving chamber with said first extension projecting further into said cam-receiving chamber than said second extension, valve operating means rotatably mounted to said casing, said valve operating means including a handle exterior of said casing and a cam member connected to and rotatable by movement of said handle, said cam member being disposed in said chamber between the adjacent ends of said extensions, sealing means for preventing leakage of water from said cam-receiving chamber around said cam member, said cam member having first and second oppositely located cam portions disposed to engage said first and second extensions respectively and thereby move said first and second valve members to open positions relative to said ports in response to rotation of said handle in one direction, said second cam portions extending further from the axis of rotation of said cam member than said first cam portion so that as said handle is rotated from a first position to second position said first cam portion engages and displaces said first extension to move said first valve member to open position while said second valve member remains closed and so said handle is rotated further to a third position said first cam portion continues to engage said first extension to hold said first valve member in open position and said second cam portion engages and displaces said second extension to move said second valve member to open position.

5. A valve according to claim 4 wherein when said handle is in said first position said cam member is fully disengaged from both said valve members.

6. A valve according to claim 4 wherein said cam comprises first and second substantially flat parallel spaced surfaces extending between said first and second cam portions, and further wherein said first cam portion comprises a flat surface connecting and extending at an oblique angle to said first and second flat surfaces and said second cam portion comprises two substantially flat converging surfaces extending between said first and second surfaces, said converging surfaces each extending at an oblique angle to said first and second surfaces, said first and second surfaces extending at approximately at right angle to the axes of said valve members when said handle is in said first position.

* * * * *

UNITED STATES PATENT OFFICE
CERTIFICATE OF CORRECTION

Patent No. 3,638,678         Dated February 1, 1972

Inventor(s)         Paul C. Symmons

It is certified that error appears in the above-identified patent and that said Letters Patent are hereby corrected as shown below:

Column 6, Line 5, Claim 4, delete "portions" and substitute --portion--;

Column 6, Line 8, Claim 4, insert "a" before --second--;

Column 6, Line 11, Claim 4, delete "so" and substitute --as--; and

Column 6, Line 28, Claim 6, delete "at" and substitute --a--.

Signed and sealed this 27th day of June 1972.

(SEAL)
Attest:

EDWARD M. FLETCHER, JR.          ROBERT GOTTSCHALK
Attesting Officer                Commissioner of Patents